April 14, 1925.

F. F. FORSHEE 1,533,241

TOASTER HEATING UNIT

Filed Oct. 4, 1922

WITNESSES:
C. N. Cochran
Wm Biebel

INVENTOR
Frank F. Forshee.
BY
Wesley G. Carr
ATTORNEY

Patented Apr. 14, 1925.

1,533,241

UNITED STATES PATENT OFFICE.

FRANK F. FORSHEE, OF FLINT, MICHIGAN, ASSIGNOR TO WESTINGHOUSE ELECTRIC PRODUCTS COMPANY, A CORPORATION OF MICHIGAN.

TOASTER-HEATING UNIT.

Application filed October 4, 1922. Serial No. 592,244.

*To all whom it may concern:*

Be it known that I, FRANK F. FORSHEE, a citizen of the United States, and a resident of Flint, in the county of Genesee and State of Michigan, have invented a new and useful Improvement in Toaster-Heating Units, of which the following is a specification.

My invention relates to electrically heated devices and particularly to electric toasters.

One object of my invention is to provide a toaster having a relatively simple, rugged and easily removable electric heating unit.

Another object of my invention is to provide a relatively simple, compact and rugged terminal structure having a removable heating element.

In practicing my invention, I provide a toaster comprising a horizontal base and a frame-work supported thereon, and material-holding means mounted on said frame, with a refractory terminal-supporting member secured to the underside of the base. A plurality of resilient electric-circuit terminal members are mounted in the refractory member. A vertically extending heating element is provided with depending contact terminals for normally engaging the electric-circuit terminal members. In-turned portions of the side parts of the frame hold the upper part of the heating element in its proper operative position, and an opening in the top plate of the frame permits the heating element to be readily and easily removed and reinserted.

Figure 1:
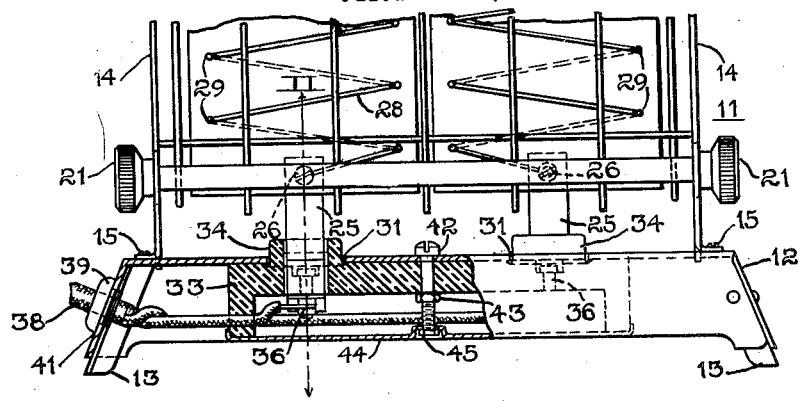
Figure 2:
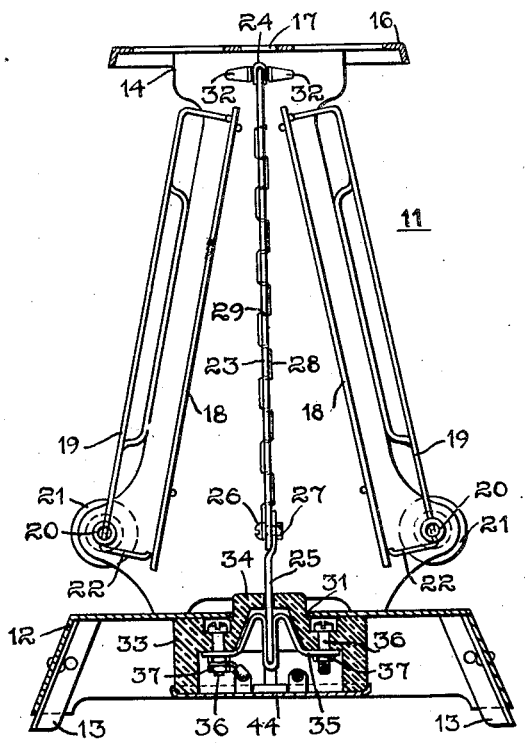

In the single sheet of drawings,

Figure 1 is a fragmentary view, partly in side elevation and partly in section, of an electric toaster embodying my invention, and Fig. 2 is a view, in vertical lateral section, taken on the line II—II of Fig. 1.

A toaster, designated generally by the numeral 11, comprises a suitable metal base plate 12 having down-turned flanges. The contour of the plate 12 may be made substantially rectangular, and a plurality of suitable heat-insulating supporting members 13 may be provided at the corners of the base plate and suitably secured against the edges of the depending flange portions. A frame work for the toaster may comprise a plurality of stamped metal end or side plates 14 located in spaced relation on the base plate and secured thereto by screws 15 extending through lateral flanges and through the top of the base plate. A top plate 16 is suitably secured to the side plates at the top thereof and is provided with a narrow elongated opening 17 extending longitudinally thereof to within a short distance of its ends and having the ends thereof located within the two side plates 14.

Means for locating a slice of bread on each side of a centrally and vertically extending heating element to be hereinafter described in detail, may comprise a lattice-work frame 18, of any suitable or desired construction, which is here shown as an open grating suitably secured against the side members 14 in any desired manner. As this invention has been developed in connection with a so-called "turnover toaster," although its use is not restricted thereto, I have illustrated means for automatically turning the toast as comprising cage members 19, each of which comprises a substantially horizontally extending rod 20 pivotally mounted in the side members 14 adjacent the bottom thereof. Each end of each rod 20 is provided with a knurled thumb nut 21 to permit of operating the cages 19 during the toasting operation. When the upper end of the cage 19 containing a slice of bread, is swung outwardly, integral inwardly extending parts 22 of the cage 19 cause the lower edge of the slice of bread to move outwardly and the toasted side of the bread to rest against the cage 19. When the cage is swung back to its normal upward position, the untoasted side of the slice is presented to the heating element.

As above stated, the device embodying my invention is not restricted to toasters of this type and may be used in any toaster of this general construction.

A quickly removable heating element 23 is located between the side plates 14 and extends vertically therebetween. The heating element comprises either a single sheet of a suitable electric insulating material or a plurality thereof, as illustrated in Fig. 1 of the drawings.

The strip of insulating material is strengthened by a metallic clamping strip 24, of substantially U-shape, which is located at the upper edge of the sheet or sheets of insulating material. At the lower edge of the insulating material, is provided a pair of thin, flat, elongated, contact terminal plates 25 which are suitably secured to the sheet of insulating material, as by screws 26 and co-operating nuts 27. As it is desired to toast two slices of bread simultaneously, a resistor member 28 is so mounted on the sheet or sheets of insulating material that its length is substantially equally distributed over the two sides of the insulating support, a construction which may be obtained by providing a series of openings 29 in the sheet or sheets of insulating material through which resistor 28 may be suitably threaded and the ends thereof electrically connected to the terminal members 25 by the holding screws 26.

The top portion of the base plate 12 is provided with a plurality of spaced openings 31 therethrough, through which the depending terminal plates 25 may extend when the heating element is in its proper operative position in the toaster.

Relatively small locating members 32 are constructed of integral struck-up portions of the top of each of the side plates 14 two such portions being employed in spaced relation relatively to each other, which are adapted to locate and hold between them the upper ends of the heating element adjacent the respective side members 14.

A refractory terminal-supporting member 33 is located within the base plate 12 and has upwardly extending bosses 34 which are provided with openings to permit the depending contact-terminal members 25 to extend therethrough, as hereinbefore described.

A plurality of resilient contact members 35 are suitably secured against the under depressed surface of the member 33 by a plurality of bolts 36 and nuts 37. The members 35 are so constructed as to provide resilient terminal members which operatively engage and resiliently clamp the lower end of each of the depending terminal plates 25.

An electric supply-circuit conductor 38, the outer end of which may be connected to the usual supply circuit (not shown) has its inner end extending through an insulating bushing 39 secured in an opening 41 in one of the side flanges of the base plate 12. The two leads of the conductor 38 may be connected respectively to the resilient contact members 35 employing one of the nuts 37 located on the bolt 36.

The refractory member 33 may be held in its proper operative position beneath the base plate 12 by a bolt 42 and nut 43 operatively engaging it and the under surface of the member 33. A bottom cover plate 44 is provided to protect the contact terminal structure hereinbefore described, and comprises a thin metal plate substantially rectangular in contour to engage the lower edge portions of the member 33. It may be held in its proper operative position by a second nut 45 operatively engaging the outer and lower end of the bolt 42.

In case of injury or damage to the heating element 23 it is only necessary to swing the two cages 19 outwardly in order to permit the operator to extend his fingers through the guard 18 and move the heating element upwardly through the opening 17, after which it may be repaired. The repaired heating element, or a new heating element, may be placed in its proper operative position by being inserted through the opening 17 in the top plate and moved downwardly until its movement is stopped by the engagement of the terminal plates 25 and the resilient members 35 which serve not only to hold the bottom portion of the heating element in its proper operative position and prevent any lateral movement thereof but also permit of energizing the resistor member 28 whenever desired.

Various changes in details and arrangement may be made without departing from the spirit and scope of the invention, and such modifications are intended to be covered by the appended claims.

I claim as my invention:

1. In an electrically heated toaster, in combination, a base plate, a top plate having a longitudinally extending opening therethrough, a frame for connecting said base and said top plate, a resilient electric circuit terminal operatively supported by said base plate, and a heating element insertible into and removable from its proper operative position relatively to said terminal through said opening in said top plate.

2. In an electrically heated toaster, in combination, a base plate, a side frame supported by said base plate, a vertically extending heating element, means on said side frame for holding the upper end of said heating element in its proper operative position, and resilient means mounted directly on and supported by said base plate for conducting current to said heating element and for supporting the same.

3. In an electrically heated toaster, in combination, a base plate, a side frame supported by said base plate, a vertically extending heating element, means on said side frame for holding the upper end of said heating element in its proper operative position, and resilient means mounted directly on and supported by said base plate for conducting current to, and for supporting said heating element, and for preventing lateral movement of the lower portion thereof.

4. In an electrically heated toaster, in combination, a base plate, a plurality of resilient electric circuit terminal members supported by said base plate, and a vertically removable heating element comprising contact terminals normally engaging said terminal members.

5. In an electrically heated toaster, in combination, a base plate, a plurality of electric circuit terminal members operatively supported by said base plate, a top plate having a longitudinally extending opening therethrough supported by said base plate, and a heating element comprising depending contact terminals normally operatively engaging said terminal members, said heating element being vertically removable from said toaster through the opening in said top plate.

6. In an electrically heated toaster, in combination, a base plate, a plurality of resilient electric circuit terminal members mounted directly on and supported by said base plate therebeneath, and a vertically extending heating element comprising depending contact terminals normally operatively engaging said terminal members for supporting said heating element and permitting energization thereof.

7. In an electrically heated toaster, in combination, a base plate, a refractory terminal-supporting member, electric circuit terminal members secured to said refractory member, a heating element comprising contact terminals supported by said electric circuit terminal members, a bottom cover member for said refractory member and a single means for operatively securing said refractory member to said base plate and said cover member against said refractory member.

8. In an electrically heated toaster, in combination, a base plate, a refractory terminal-supporting member located beneath said base plate and having a plurality of openings therethrough, a plurality of resilient electric-circuit terminal members secured to said refractory member at said openings, a framework located on and supported by said base plate, a heating element comprising depending contact terminals located within said framework and vertically removable therefrom, said depending terminals normally extending through said openings and operatively engaging said resilient terminal members.

In testimony whereof, I have hereunto subscribed my name this 25th day of Sept., 1922.

FRANK F. FORSHEE.